Figure 2:
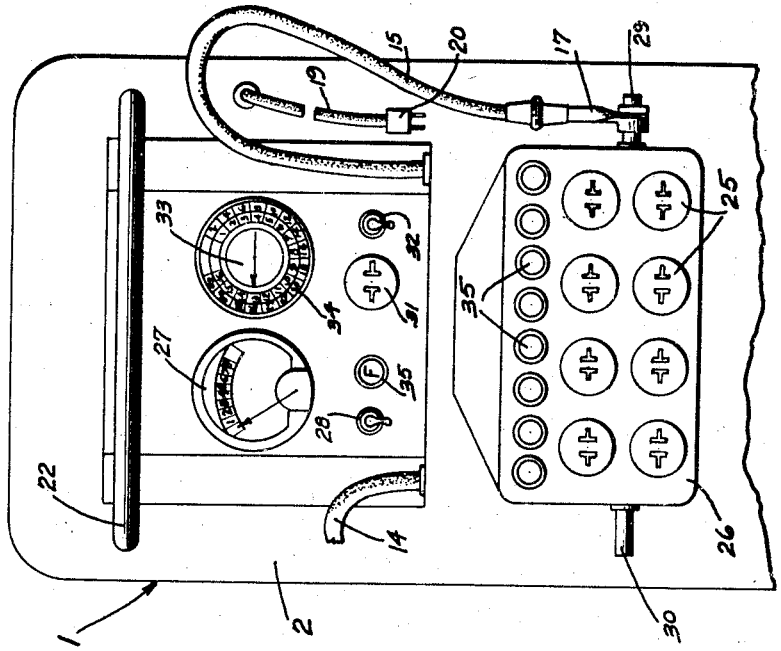

June 10, 1947.  W. E. BRUNEY  2,421,828
FAST CHARGE UNIT
Filed Jan. 19, 1945  3 Sheets-Sheet 1

Inventor
William E. Bruney

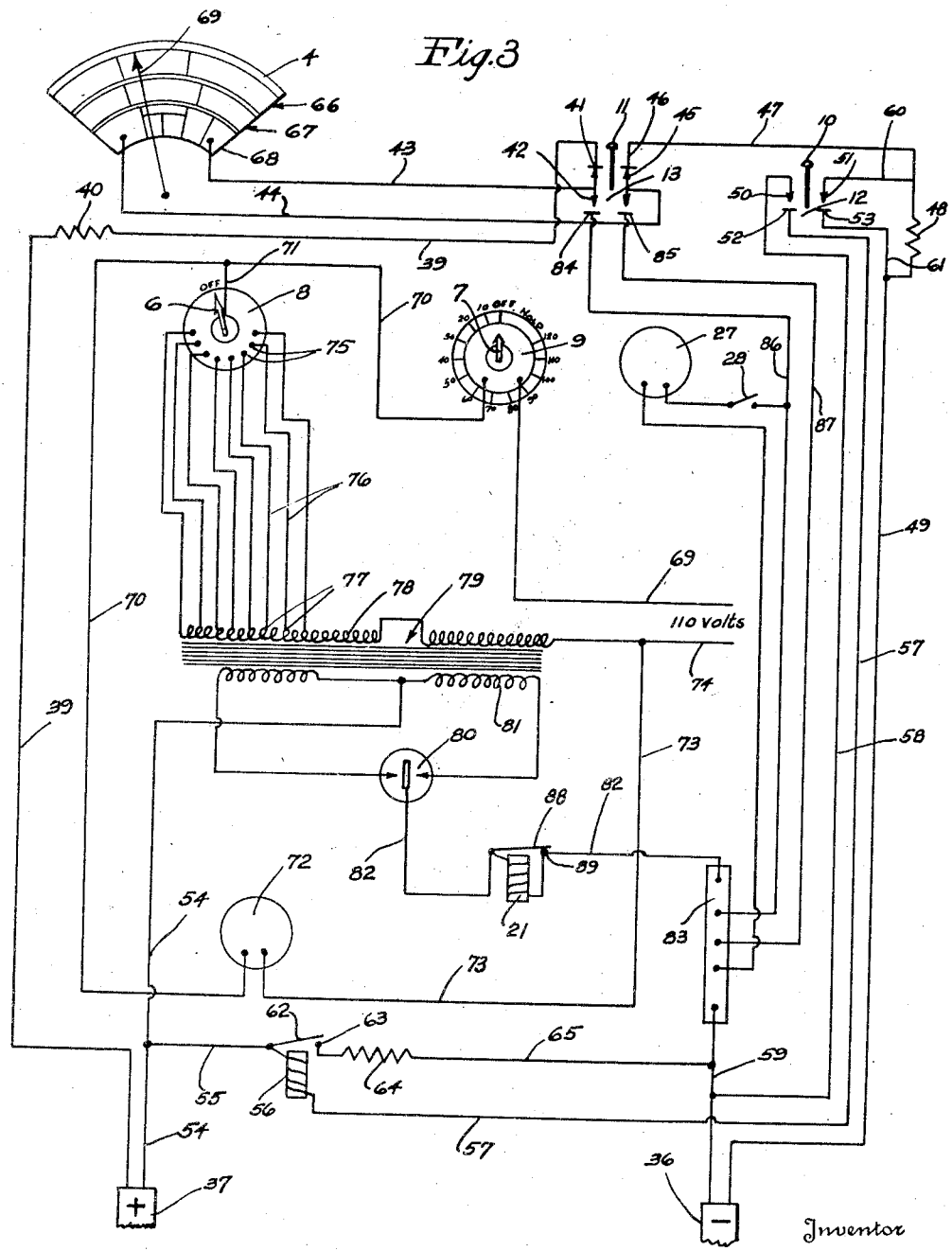

June 10, 1947.  W. E. BRUNEY  2,421,828
FAST CHARGE UNIT
Filed Jan. 19, 1945  3 Sheets-Sheet 3
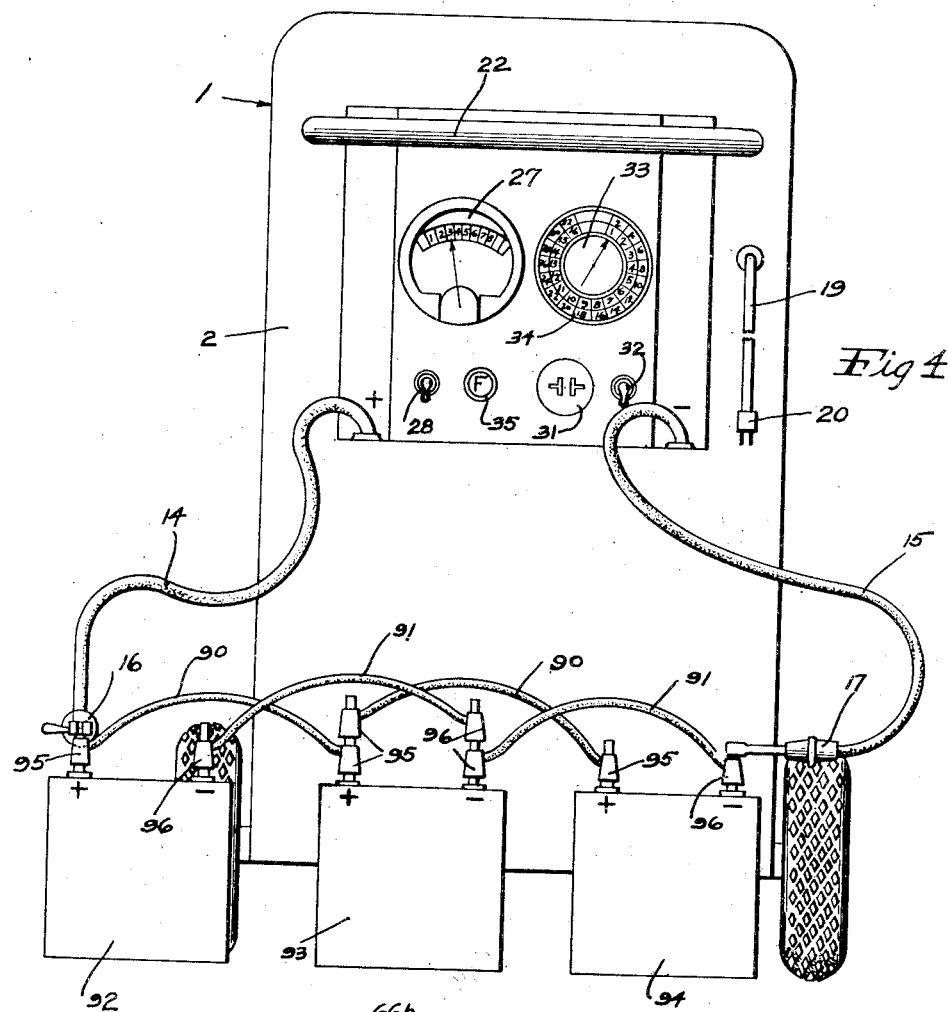
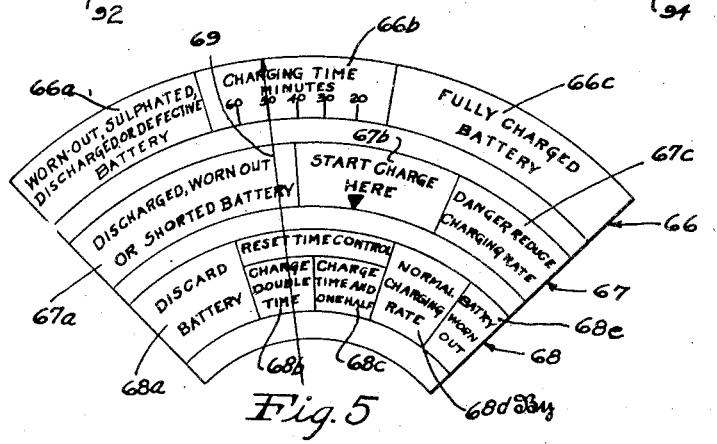
Inventor
William E Bruney
Attorney Patented June 10, 1947

2,421,828

UNITED STATES PATENT OFFICE 2,421,828

FAST CHARGE UNIT

William E. Bruney, Akron, Ohio, assignor to Wingfoot Corporation, Akron, Ohio, a corporation of Delaware Application January 19, 1945, Serial No. 573,541

14 Claims. (Cl. 320—20)

This invention relates to a process of and apparatus for charging storage batteries. More particularly, the invention is concerned with a method of and means for accurately testing the condition of a storage battery and for impressing a safe charge upon a discharged battery after having determined its condition and its ability to accept a charge.

The method and apparatus contemplated by the instant invention are particularly advantageous in that they possess important features which have not hitherto been employed in such equipment. The teachings of the present invention are especially adapted to use in accordance with the socalled "fast charging" principle of recharging storage batteries of the type employed in automobiles and other similar vehicles.

It is an object of the present invention, therefore, to provide an efficient method of fast charging for storage batteries which will impress a charge upon the battery at a safe charging rate to restore it to its normal operating capacity without in any way damaging the battery.

It is a further object of the present invention to provide an apparatus for fast charging of storage batteries which will not only possess a high degree of utility but will operate efficiently and economically to produce the desired results.

A further object of the present invention is to provide a process for accurately testing the ability of a storage battery to accept current in the recharging operations for a predetermined time interval and at a substantially constant voltage sufficient to recharge the battery.

Another and still further object of the present invention is embodied in the provision of a compact, mobile charger unit which is capable of being readily and cheaply manufactured on a production basis.

Conventional fast charger units and their methods of operation are, generally speaking, capable of classification in one or the other of two prominent classes. The first and perhaps most common class includes equipment of the type which embodies the setting of the charging rate to produce a high starting ampere flow regardless of voltage required. If the battery to be charged is badly sulphated, this requires a voltage high enough to cause damage to the battery.

The other conventional form of fast charging apparatus is designed to prevent damage to the battery being recharged by automatically cutting off the charging current when the internal temperature of the battery exceeds a safe limit irrespective of the state of charge of the battery. While it does protect the battery, this precedure has a distinct disadvantage in that the discharged battery may be returned to service incompletely charged. This situation is especially prevalent when there is present in the battery a high degree of sulphation of the plates which results in the creation of abnormal internal temperatures long before the charging operation is completed.

It is a well known problem, in the practice of the first mentioned charging method, that to obtain a high rate charge it is necessary to use an abnormally high voltage. This voltage working through the higher resistance of a sulphated battery causes abnormally high internal temperatures which may, under certain circumstances, result in the warping of the plates with consequent shorting of the battery. A common phenomenon of storage batteries, known as "gassing," will also frequently occur in an extreme way in a badly sulphated battery when it is charged at an excessive voltage. Considerable damage can result to the active material in the plates of a battery, under such circumstances, for the reason that small pockets of gas are generated internally of the active material and, in its efforts to become released into the body of the acid surrounding the plates, this gas carries with it portions of the active material thereby causing excessive shedding of the plates and shortening the life of the battery.

In an effort to overcome the aforementioned disadvantages and possible destruction of storage batteries during the charging operation, the second conventional process was developed. Apparatus for practicing this process embodies a thermostatic control which is inserted in the acid of the battery being charged to automatically halt the operation of the charging unit when the temperature in the interior of the battery exceeds a maximum safe limit. While this procedure prevents damage to the battery through overheating it nevertheless introduces certain other difficulties such, for example, as the incomplete recharging of the discharged battery and failure to control voltage during the period required to reach its maximum allowable temperature thereby permitting excessive gassing from the start of the charging operation until the thermostat operates.

This result is traceable to the fact that, once the internal temperature of the battery exceeds the predetermined maximum allowable temperature during the charging operation, the thermostatic control of the charger unit will operate to prevent further charging of the cells. Thus, if the attendant fails to check the condition of the battery, he naturally assumes that, since the charging unit has ceased to function, the charging operation has been completed. However, as a matter of fact, the battery may be incompletely charged and unsatisfactory for fulfilling normal service demands.

The process and apparatus of the present invention have been developed with a view to eliminating all of the aforementioned difficulties which are common to conventional fast charging operations. Storage batteries charged according to the teachings of the present invention will, in every instance, be charged to their normal operating capacity sufficient to enable them to carry normal operating loads. The process and apparatus of the invention will achieve these optimum results without danger of warping the battery plates or decomposition of the active material on the plates.

These advantageous results are obtained according to the teachings of the invention first, by accurately testing not only the capacity of the battery to deliver current under its normal operating load but also its ability to accept current. Secondly, having determined these important factors concerning the battery which is to be recharged, it is then possible to set a charging rate at a predetermined constant voltage such as will not injure the battery.

An important feature of the method and apparatus of the present invention is its ability to accurately test the battery, a factor which aids in guarding against a possibility of producing a current flow through the battery during the charging operation which might cause damage to the battery. The testing operation, as taught by the present invention, embodies a first step of measuring the voltage drop across the battery under a normal operating load or, in other words, its ability to maintain its maximum voltage under a load of approximately 160 amperes.

A second step in the operation involves the measuring of the ampere flow through the battery with the charger unit operating to produce a substantially constant voltage of not to exceed approximately 7.8 volts. From these tests it is possible to determine first, the degree of sulphation of the plates of the discharged battery, and secondly, the possible shorting of one or more cells resulting from worn or warped plates or faulty separators.

In the course of the charging operation contemplated by the present invention, it is customary to measure the voltage drop across the battery under a normal load to determine the time required to restore the battery to average normal capacity at a charging rate in amperes which is substantially equal to the normal maximum capacity of the charging unit; set the charging unit to deliver a predetermined constant voltage normally capable of producing in a discharged battery a current flow substantially equal to the normal maximum charging capacity of the charging unit in amperes; correct the charging time determined for the charging rate based upon the ampere flow by a factor representing the ratio of the normal maximum charging capacity of the charger to the current flow measurement obtained when a constant voltage is impressed upon the battery; and thereafter continue the charging operation for the duration of the corrected time interval. Thus, the recharging of the battery to its normal operating capacity will be accomplished by impressing a substantially constant voltage thereon and, therefore, conditions of sulphation effecting increased resistance, or the presence of shorted or worn out plates causing low resistance, will be automatically compensated for.

Other advantages and objects of the present invention will be more fully apparent as the description of the invention proceeds.

The teachings of the present invention are particularly advantageously delineated by apparatus for the fast charging of a storage battery of the type employed in automobiles and other similar vehicles. It will be understood that the present invention is not intended to be so restricted in its application but rather will be so described in order to provide a full understanding of its teachings.

Figure 1:
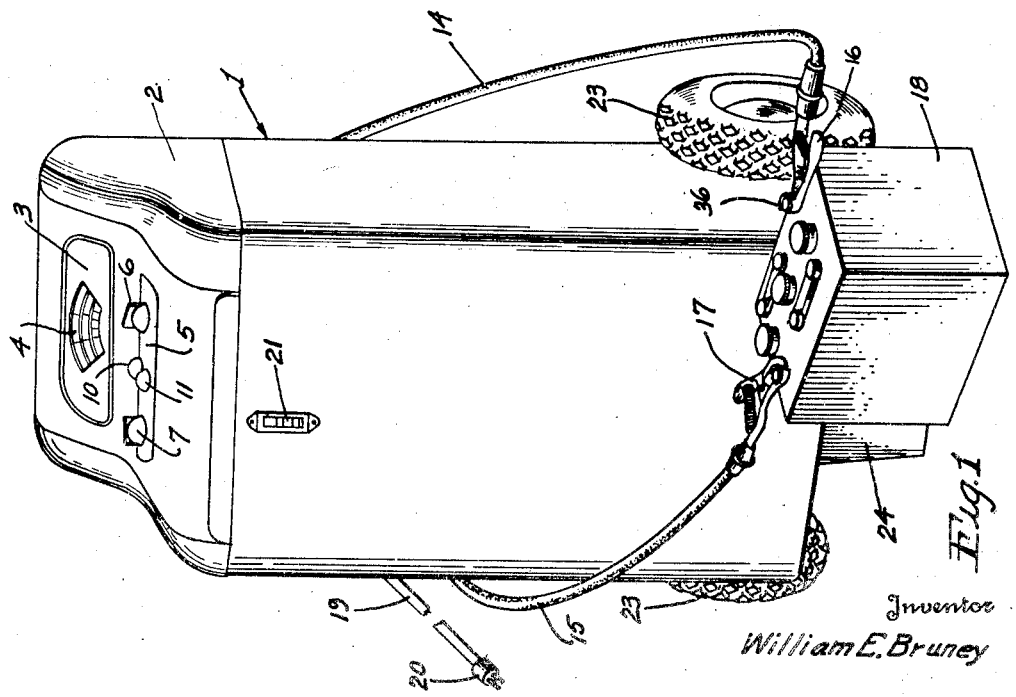

Figure 1 represents a front view in perspective of one form of fast charging unit embodying the teachings of the present invention. Figure 2 is a partial rear elevation of the apparatus shown in Figure 1. Figure 3 is a diagrammatic illustration of a typical wiring diagram embodying the several elements of the fast charging unit illustrated in Figures 1 and 2 and being adapted to operate in accordance with the principles of the present invention. Figure 4 corresponds generally to Figure 2 but illustrates a slightly different embodiment of the charger unit. Figure 5 is an illustration of the dial of the voltammeter of the fast charging unit of the present invention at a slightly larger scale.

In Figure 1 of the accompanying drawings, a battery charger unit of the type embodying the teachings of the present invention is indicated generally by the reference character 1. The charger unit 1 is advantageously provided with a suitable housing or cabinet 2 enclosing the working elements to protect them not only from possible tampering but also to prevent the infiltration of dust, dirt and other foreign materials to the operating parts. In the uppermost portion of the cabinet 2 is located a panel 3 in which the dial of an electrical measuring device, hereinafter designated simply as the voltammeter 4, is exposed to the view of the attendant. The dial of the voltammeter 4, as shown in Figure 5, is preferably calibrated in a plurality of different ranges or segments and embodies a multiple number of parallel bands of arcuate form for indicating the condition of a storage battery and providing visual inspection of the operation of the charger unit in a manner to be hereinafter more fully described.

Adjacent and below the panel 3 on the cabinet 2 of the charger unit 1 is disposed an operating panel 5 embodying knobs 6 and 7 which control the stage switch 8 and the time switch 9, respectively, as indicated in Figure 3. In addition to the knobs 6 and 7 on the panel 5, there is provided a pair of push buttons 10 and 11 for actuating a double pole single throw switch 12 and a double pole double throw switch 13, respectively. (See Figure 3.) The switches 12 and 13 may advantageously take the form of one of the conventional types of momentary contact switches and, as indicated in Figure 3, will operate to control the use of the voltammeter 4 to indicate the battery condition in the testing operation by alternately connecting it into the circuit, first as a voltmeter and then as an ammeter.

A pair of flexible cable connections 14 and 15, at the ends of which are connected the clips 16 and 17, respectively, for manual engagement and disengagement with respect to the terminals of a storage battery 18, are connected into the rear of the cabinet 2 of the charger unit 1. The connections 14 and 15 may advantageously be temporarily stored upon an automatic reel or other suitable form of windup device (not shown) within the interior of the cabinet. A connecting cord 19 is provided with a plug-in 20 for connection into a suitable convenience outlet to provide electrical current for the charger unit 1 for recharging the battery 18.

After the plug 20 has been connected to the convenience outlet, the limit switch 21 on the front of the cabinet 2 will control the operation of the charger unit 1 in cooperation with the time switch 8. The switch 21 is so designed that the circuit is broken in the event that the current flow exceeds 100 amperes thereby protecting the apparatus against damage.

The charger unit 1 illustrated in Figures 1 and 2 is preferably of the portable type being provided with a handle 22 by means of which the unit may be tilted slightly toward the horizontal plane to enable it to be maneuvered about upon the wheels 23 to any desired position at which the recharging operation is to take place. A suitable stand or foot 24 is secured to the base of the cabinet 2 to permit the unit to stand vertically after it has been moved to the desired location for the performance of the charging operation.

When it is desired to charge from one to eight storage batteries over night the several outlets 25 provided on the connection panel 26 may be employed for the reception of a suitable number of plug-in connections of flexible wire cable having terminal clips thereon for engagement with the terminals of each battery to be recharged. According to this latter charging operation, the knob 6 on the panel 5 is rotated in a clockwise direction from the "off" position until the pointer associated with the dial of the group charge ammeter 27, is positioned adjacent that number on the ammeter dial which corresponds to the number of batteries connected into the connection panel 26. A toggle switch 28 controls the above mentioned ammeter 27 placing it either in or out of the circuit. It is necessary in order to deliver current to the connection panel 26 to have the clips 16 and 17 connected to the posts 29 and 30, respectively, on the connection panel 26.

Suitable fuses 35 for guarding against the occurrence of inadvertent overloads in various parts of the operating circuit are provided to protect the charging unit against damage.

Conventional forms of trickle charging apparatus may advantageously be connected with and embodied in the charger unit 1 to afford a means for trickle charging of one or more new stock batteries at a low charging rate. As many as thirty-two batteries may be placed on trickle charge and the equipment is so designed that it automatically delivers, upon the proper adjustment of the unit, the proper amount of current proportional to the number of batteries included in the circuit for the purpose of replacing normal standing discharge.

When it is desired to charge at a low rate a large number of batteries as indicated above such, for example, as sixteen to thirty-two batteries to maintain a charge in stock batteries, a flexible cable (not shown) may be plugged into the outlet 31 on the rear of the cabinet 2. The several batteries are inter-connected, in turn, by a series of cables in parallel and may be carried upon a storage rack (not shown) on which the batteries are supported in adjacent relation. When the outlet 31 is to be used it is necessary to throw the toggle switch 32 into its closed position and to adjust the knob 33 until the arrow thereon is directed to that number on the adjacent scale 34 which corresponds to the number of batteries in the storage rack which are to be placed on charge. The unit advantageously provides two concentrically arranged scales cooperating with the knob 33 to afford both a slow and a fast trickle charge.

Details of the wiring diagram of Figure 3 and the cooperative relationship between the several elements comprising the charger unit 1 of the invention may best be understood from an explanation of the actual step-by-step operation of the device in the testing and charging of the discharged storage battery 18. Let us assume, therefore, that it is desired to restore the discharged battery to its normal operating potential. According to the teachings of the present invention, it is first necessary to determine the condition of the battery or, in other words, its ability to accept a charge.

In the performance of the testing operation, the clips 16 and 17 are first attached to the terminals 36 and 37, respectively, of the battery 18. These terminals 36 and 37 represent the negative and positive terminals of the battery being recharged as indicated diagrammatically in Figure 3 of the drawings. With the connection of the clips 16 and 17 on the terminals 36 and 37 a circuit is temporarily completed to connect the voltammeter 4 across the battery terminals as a voltmeter.

The one side of the circuit embodying the voltammeter 4 is thus completed by means of the conductor 39 connected to the positive terminal 37 of the battery, through resistor 40 in the conductor 39, to the uppermost fixed contact 41 of the switch 13, its pole 42 and conductor 43. The other side of the circuit including the voltammeter 4 is completed through the conductor 44, the pole 45, and fixed contact 46 of the switch 13, conductor 47 in which is positioned a resistor 48 and, finally, conductor 49 which is directly connected to the negative terminal 36 of the battery.

To execute the test, it is necessary first to manually depress the push button 10 of the switch 12. This operation closes the poles 50 and 51 with respect to the fixed contacts 52 and 53, respectively, of the switch 12. The actuation of the switch 12 now completes a circuit from the positive battery terminal 37 through conductors 54 and 55, through the coil of relay 56, and conductor 57 to the fixed contact 52 with which the pole 50 of the switch 12 is now in contact, thence through conductors 58 and 59 to the negative battery terminal 36. The closing of the pole 51 of the switch 12 with respect to its fixed contact 53 causes the current flowing from switch 13 through conductor 47 to bypass the resistor 48 through conductors 60 and 61 which serve to complete that portion of the circuit by their connection with conductor 49. This operation recalibrates the voltammeter 4 for the voltage drop test for the battery.

The energizing of the coil of the relay 56 now operates to close an auxiliary circuit from the positive battery terminal 37 through conductors 54 and 55, arm 62, and fixed contact 63, thereby throwing the resistance 64, connected by conductors 65 and 59 with the negative battery terminal 36, across the battery. The voltammeter 4 now operates as a voltmeter and serves to register the ability of the battery 18, with which it is now connected, to maintain voltage under average starting motor current draw. The resistor 64 operates as a discharge resistance which is comparable to the normal load expended by a storage battery in the operation of the average automobile starter.

As previously indicated, the dial of the voltammeter 4 shown in greater detail in Figure 5 is provided with three arcuately shaped bands 66, 67 and 68, each of which is subdivided into appropriate ranges which will register the battery condition at various stages in the operation of the charger unit 1. In the first testing operation, only the uppermost band 66, which is subdivided into three divisions 66a, 66b and 66c, is used. A pointer 69 which serves to sweep across the entire expanse of the several bands 66, 67 and 68 will register in the testing operation with one of the three divisions of the band 66 and thereby indicate visually to the attendant the ability of the battery to accept a flow of current comparable to that required in the ordinary usage of the battery.

The division 66a of the scale 66 indicates that the battery is fully discharged or badly sulfated and suggests charging the battery for a 3-minute interval and thereafter testing the battery once again. The division 66b on the band 66 is designated as the recommended charging time required to restore the discharged battery to its proper potential and may be calibrated in minutes of charging time (from 0 to 60 minutes) which will be required at a charging rate of 80–100 amperes to bring the battery to 1250 gravity. The remaining division 66c of the band 66 indicates that the battery is fully charged or, in other words, that it has a gravity of 1250 or better. In the testing operation, the pointer 69 will come to rest within the limits of one of the three divisions 66a, 66b or 66c of the band 66 and thus will reveal the condition of the battery being tested.

If, in the course of the test, the pointer 69 registers with division 66a of the band 66, the battery should, as indicated thereon, be charged for a 3-minute interval and tested a second time. This procedure serves as a preliminary check and final determination as to whether or not there is any possibility of saving the battery is advantageously left to the final test. When the pointer 69 registers with division 66c, the battery is in good condition and requires no further charging. If the pointer 69 registers with division 66b, the charging time required is read in minutes on the calibrated scale provided thereon and this reading will represent the number of minutes that the charger unit should be operated based on the drop in voltage in the battery and assuming that the battery is in normal unsulphated but discharged state.

Next, with both push buttons 10 and 11 in their normal position as indicated in Figure 3, i. e., with poles 42 and 45 of the switch 13 in contact with their respective fixed contacts 41 and 46 while the poles 50 and 51 of switch 12 are out of contact with their respective fixed contacts 52 and 53, the circuit will be completed in the manner previously described before the push button 10 was depressed. The plug-in 20 having been connected to a source of electrical current, the main power conductor 69 supplies current to one side of the time switch 9 which may be of any conventional type adapted to operate for at least a 120-minute cycle. The knob 7 on the operating panel 5 is rotatable in a counterclockwise direction and serves to control the setting of the time switch.

Conductors 70 and 71 connect the other side of the time switch 9 with the stage switch 8 and a fan 72 which is in turn connected as by means of conductor 73 with the other main power conductor 74. The stage switch 8 is provided with a plurality of taps 75 which are interconnected through the conductors 76 with a corresponding number of connections 77 on the primary winding 78 of the variable transformer 79. A comparatively wide variance in the adjustment of the transformer 79 is thus provided to produce a variety of voltages to obtain the desired amperage through the full wave rectifier 80 (preferably of the copper oxide type) with which the transformer secondary winding 81 is connected.

The secondary winding 81 of the transformer 79 is connected with the positive battery terminal 37 as by means of conductor 54. The rectifier 80 is connected by means of the conductor 82 in which is disposed the limit switch 21 to one of the terminals on the shunt 83. The conductor 59 is adapted to complete the charging circuit from the rectifier 80 by interconnecting the negative battery terminal 36 with one of the terminals on the shunt 83.

After the charging time has been determined from the first test performed upon the discharged battery in the manner previously described the time switch 9 is set by the counter-clockwise rotation of knob 7 on the operating panel 5 for the number of minutes determined by the reading obtained on the calibrated scale of the division 66b. The main switch 21 is next closed to complete the circuit and to start the charging cycle. Knob 6 is then rotated in a clockwise direction until the pointer 69 cooperating with the dial of the voltammeter 4 is positioned in the division 67b of band 67 and in registration with the arrow head shown thereon. Since the voltammeter 4 is connected across the battery terminals 36 and 37 as a voltmeter, the adjustment of the stage switch 8 by the rotation of the knob 6 in the manner described will cause the voltage impressed upon the battery to be indicated by the voltammeter 4 in order that the stage switch 8 may be adjusted so as to remain within the safe charging range of between approximately 7.2 and 7.8 volts.

It is not practicable to so design and construct the charger unit 1 to render it completely universal for every conceivable set of circumstances and conditions to which it may be subjected in its employment. Thus, it may be found that as the charge is impressed upon a discharge battery, a surface charge is first built up on the plates. This surface charge on the battery plates increases the resistance of the battery to the charge, in the nature of a back pressure, and may cause the pointer 69 of the voltammeter 4 to vary its position with respect to the arrow head in the division 67b of band 67.

Thus, it may become necessary in the course of the charging operation to reset the stage switch 8 so as to bring the pointer 69 back into exact registration with the arrow head thereby insuring the maintenance of the proper safe charging range to restore the battery to its normal operating capacity. It is, therefore, advantageous to check the position of the pointer 69 after a short time interval such, for example, as a 10-minute period, has elapsed after the start of operations. It will be readily understood that if the battery already has a slight surface charge on the plates, the pointer 69 will probably not change its position and thus require no adjustment of stage switch 8.

This first step in the operation of the charging unit 1 above described automatically permits the battery to select the proper safe ampere charge based on its own internal resistance as determined by the degree of sulphation of the plates and prevents a high voltage condition with resultant damage to the battery. If, in the course of this step, the pointer 69 remains in registration with the division 67a of the band 67 on the dial of the voltammeter 4 the battery is undoubtedly shorted or worn out and should be discarded. If, on the other hand, the pointer 69 moves over to the division 67c of the band 67 there is danger of the charging voltage being too high. In such cases, the operator is warned to adjust the setting of the stage switch 8 to reduce the charging rate.

After a reasonable interval of time has elapsed in the operation of the charging unit 1 on the predetermined charging voltage, it is desirable to check the amperage to determine whether or not, if the charge is continued, the battery will eventually be charged to its normal operating capacity. For this purpose, the push button 11 associated with switch 13 should be pressed down, causing the poles 42 and 45 thereof to close contact with the lowermost fixed contacts 84 and 85, respectively, and at the same time breaking their contact with the uppermost fixed contacts 41 and 46. This operation serves to connect the voltammeter 4 into the circuit as by means of the conductors 86 and 87 through the shunt 83 thereby eliminating the resistors 40 and 48 previously in the circuit.

In this step of the operation of the charging unit 1, if the pointer 69 is located within the division 68a of the band 68 on the dial of the voltammeter 4, the battery should be discarded as being incapable of accepting a charge. The registration of the pointer 69 within the limits of the division 68b signifies that the charging time for which the timer 9 has been set to control the operation of the charging unit 1 should be doubled to charge the battery at the safe rate to its normal operating capacity. The division 68c, when indicated by the pointer 69, denotes a change required to be made in the charging time to a period one and one-half times the duration of that previously determined to obtain the desired result. The registration of the pointer 69 within division 68d signifies that the charging time is correct and it requires no alteration to completely charge the battery. If the pointer 69 moves to a point within the last division 68e, the battery is worn out and should be discarded.

It will be understood that the timer unit 9 is readily adapted to be shifted during the course of its operation by the rotation of the knob 7 in a counter-clockwise direction to increase the charging time upwardly to a duration of approximately two hours since the motor of the timer 9 operates on a maximum cycle of 120-minutes. This time interval provided should satisfactorily take care of any average battery which will be capable of being recharged without further and extensive servicing.

In the operation of the charger unit 1, a shorted battery will draw a current of more than 100 amperes at a substantially constant voltage of 7.2 to 7.8 volts. Such an occurrence will cause the limit switch 21, which is essentially a relay, to release a contact arm 88 thereby breaking the circuit at the fixed contact 89 associated therewith in the conductor 82 whenever the current flow through the circuit exceeds 100 amperes. Thus, the rectifier 80 and other associated elements in the circuit will be amply protected against such damage.

It will be apparent that any of several modifications may be embodied in the structure of the charging unit 1 without materially changing the spirit or scope of the invention. Such a modification is represented by the embodiment of the invention illustrated in Figure 4 of the drawings in which the connection panel 25 accommodating from one to eight batteries for overnight charging at a low charging rate has been eliminated. Substantially the same purpose may, however, be accomplished by the use of a plurality of jumper elements 90 and 91. As indicated in the drawing the jumper elements 90 are adapted to interconnect the positive terminals of the several batteries 92, 93 and 94. The jumper elements 91 are, in turn, employed to interconnect the negative terminals of these batteries.

The jumper elements 90 are made of a very heavy wire or cable which is insulated and provided with caps 95 at opposite ends thereof. Each of the caps 95 is provided with a hollow base of substantially frusto-conical shape having an upper portion thereon in the form of a terminal post the diameter of which corresponds to that of the positive battery terminal. The jumper elements 91 are constructed similarly to the jumper elements 90 but employ caps 96 which are of a different size from that of caps 95.

This feature prevents the interchangeability of the jumper elements 90 and 91 and is adapted to prevent the possibility of interconnecting negative and positive poles inadvertently. Thus, like caps 95 of jumper elements 90 are adapted to interfit in vertically stacked relation in the manner indicated with respect to the battery 94 illustrated in Figure 4 while the caps 96 of the jumper elements 91 are likewise capable of being disposed in interfitting relation.

In order to place the series of batteries 92, 93 and 94 on charge the cable 16 is attached to the top of cap 95 of jumper element 90 associated with the battery 92 while the clip 17 is attached to the top of cap 96 of jumper element 91 connected to the battery 94. The interconnection between the several jumper elements 90 and 91 and the clips 16 and 17 provided on the flexible cable connections 14 and 15, respectively, serves to supply the current from the battery charger unit 1 to each of the several batteries.

As in the instance previously described with respect to Figure 2 in the charging of a plurality of batteries on an overnight charge at a slow rate, it is necessary to throw the switch 28 to bring the indicating ammeter 27 into operation. Next, the knob 6 on the operating panel 5 is adjusted in clockwise direction until the pointer associated with the dial of the group charge ammeter 27 is positioned adjacent the number on said dial which corresponds to the number of batteries interconnected in the manner previously described. For the purpose of accomplishing the overnight charge, a holding position is provided on the time switch 9 and, when the knob 7 is adjusted to that position, the charging operation will be not automatically discontinued.

Other similar modifications will be readily apparent to those skilled in the art and may be adopted without materially changing the general structure of the apparatus as contemplated by the present invention or without departing from the spirit of the invention.

While in accordance with the patent statutes one best known embodiment of the invention has been illustrated and described in detail, it is to be particularly understood that the invention is not limited thereto or thereby, but that the inventive scope is defined in the appended claims.

What I claim is:

1. The method of charging a storage battery comprising the steps of impressing a substantially constant voltage within a predetermined minimum upon the battery to be charged for a time interval commensurate with that required to restore to its normal operating capacity an unsulphated battery having the same state of discharge as the battery to be charged, measuring the current flow through the battery during the charging operation at the constant voltage selected to determine the effect of its sulphation condition upon the probability of restoring it to its normal operating capacity within the time interval determined in the preceding step, and, without interruption of the charging operation, revising the aforementioned time interval as required to insure the restoration of the battery to its normal operating capacity at the constant voltage.

2. The method of charging a storage battery comprising the steps of impressing a substantially constant voltage within a predetermined minimum upon the battery to be charged for a time interval commensurate with that required to restore to its normal operating capacity an unsulphated battery having the same state of discharge as the battery to be charged, checking the voltage after a predetermined time interval during the charging operation and correcting for any deviation therein, measuring the current flow through the battery during the charging operation at the constant voltage selected to determine the effect of the sulphation condition of the battery being charged upon the probability of restoring it to its normal operating capacity within the time interval determined in the first step, and, without interruption of the charging operation, revising the aforementioned time interval as required to insure the restoration of the battery to its normal operating capacity at the constant voltage.

3. The method of charging a storage battery comprising the steps of measuring the voltage drop across the battery to be charged under normal load in terms of the time required to restore to its normal operating capacity an unsulphated battery having the same state of discharge as the battery to be charged, impressing a charge upon the battery to be charged for the time interval determined in the preceding step at a substantially constant voltage within a predetermined minimum range, measuring the current flow through the battery during the charging operation at the constant voltage selected to determine the effect of the sulphation condition of the battery being charged upon the probability of restoring it to its normal operating capacity within the time interval determined in the first step, and, without interruption of the charging operation, revising the time interval determined in the first step as required to insure the restoration of the battery to its normal operating capacity at the constant voltage selected.

4. The method of charging a storage battery comprising the steps of measuring the voltage drop across the battery to be charged under normal load in terms of the time required to restore to its normal operating capacity an unsulphated battery having the same state of discharge as the battery to be charged, impressing a charge upon the battery to be charged for the time interval determined in the preceding step at a substantially constant voltage within a predetermined minimum range, checking the voltage after a predetermined time interval and resetting the charging rate at the constant voltage in the event of deviation therefrom without interruption of the charging operation, measuring the current flow through the battery during the charging operation at the constant voltage selected to determine the effect of the sulphation condition of the battery being charged upon the probability of restoring it to its normal operating capacity within the time interval determined in the first step and, without interruption of the charging operation, revising the time interval determined in the first step as required to insure the restoration of the battery to its normal operating capacity at the constant voltage selected.

5. The method of charging a storage battery comprising the steps of determining the time required to restore a discharged unsulphated battery to its normal state of charge at a charging rate which will produce a current flow through the battery of approximately 80 to 100 amperes, measuring the current flow through the battery while it is connected to a supply source delivering a substantially constant voltage of the order of approximately 7.2 to 7.8 volts, and thereafter continuing to impress the constant voltage on the battery for a time interval the duration of which is determined by correcting the time determined in the first step by the ratio of the current flow in amperes produced by the selected charging rate to the current flow measured in the second step.

6. The method of charging a storage battery comprising the steps of determining the time required to restore a discharged unsulphated battery to its normal state of charge at a charging rate which will produce a current of approximately 80 amperes within the battery, measuring the current flow through the battery to be charged while it is connected to a supply source delivering a substantially constant voltage of not to exceed approximately 7.8 volts, and continuing to impress the constant voltage on the battery for a time interval the duration of which is determined by correcting the time obtained in the first step by the factor 80/I in which I represents the current flow measured in the second step.

7. The method of charging a storage battery comprising the steps of determining the time required to restore a discharged unsulphated battery to its normal state of charge at a charging rate which will produce a current of approximately 80 amperes within the battery, measuring the current flow through the battery to be charged while it is connected to a supply source delivering a substantially constant voltage of approximately 7.3 volts, continuing to impress the constant voltage on the battery for a time interval the duration of which is determined by correcting the time obtained in the first step by the factor 80/I in which I represents the current flow measured in the second step, checking the voltage after a predetermined time interval, and resetting the charging rate as may be necessary at approximately 7.3 volts.

8. The method of charging a storage battery comprising the steps of connecting resistance across the battery to produce a flow of current therefrom substantially equivalent to its normal service current demands, determining the time required to restore the full capacity of a discharged unsulphated battery at a charging rate capable of producing a current of approximately 80 amperes within the battery, connecting the battery to be charged to a supply source which delivers a substantially constant voltage of approximately 7.3 volts, measuring the current flow through the battery, and, thereafter, continuing to impress the constant voltage on the battery for a time interval, the duration of which is determined by the factor 80/I in which I represents the current flow measured in the second step, thereby compensating for the degree of sulphation of the battery being charged.

9. A quick charging unit for recharging a storage battery comprising means for determining the time required to fully charge a discharged unsulphated battery at a charging rate of approximately 80 amperes, means for supplying a substantially constant voltage of not to exceed approximately 7.8 volts to the battery being charged, means for measuring the current flow through the battery at the fixed charging rate, and timing means for controlling the duration of the output from the constant voltage supply source, said timing means being adjustable to operate the voltage supply source for an interval equal to the time reading obtained from the determining means corrected by the factor 80/I in which I represents the current flow measured by the means provided therefor.

10. A quick charging unit for recharging a storage battery comprising an electrical measuring device calibrated in minutes of charging time required to restore a discharged unsulphated battery to its normal state of charge, means supplying to the battery to be charged a substantially constant voltage within a predetermined range, timing means, and means enabling the electrical measuring device to determine the effect upon the current flow induced in the battery caused by the sulphation condition thereof, and the sufficiency of the originally determined time interval to restore the battery to its normal state of charge.

11. A quick charging unit for recharging a storage battery comprising means impressing a charge upon the battery to be charged at a substantially constant voltage within a predetermined range, timing means controlling the operation of the charge impressing means, an electrical measuring device for determining the time interval required to restore a discharged unsulphated battery to its normal state of charge, and means for recalibrating the electrical measuring device to determine the time correction factor for resetting the timing means to insure the restoration of the battery being charged to its normal state of charge and to counteract for its sulphation condition.

12. A quick charging unit for recharging a storage battery comprising an electrical measuring device, a resistance unit, means connecting the resistance across the battery to be charged to provide for determination upon the electrical measuring device, of the time interval required to restore an unsulphated battery having the same degree of discharge to its normal state of charge, and means recalibrating the measuring device during the charge operation to enable the electrical measuring device to provide a correction factor for the resetting of the timing means as determined by the state of sulphation of the battery being charged.

13. The method of charging a storage battery comprising the steps of determining the time required to restore an unsulphated battery having the same state of discharge as the battery to be charged to its normal operating capacity by impressing a charge thereon at a substantially constant voltage within a predetermined minimum range, correcting during the charging operation for any deviation in the constant voltage selected, measuring the current flow through the battery after correcting for any deviation in the constant voltage selected and in the course of the charging operation thereby determining the effect of the sulphation condition of the battery being charged upon the probability of restoring the battery to its normal operating capacity at the selected voltage within the time interval determined in the first step, and, without interruption of the charging operation, revising the originally determined time interval as required to insure the restoration of the battery to its normal operating capacity at the constant voltage selected.

14. The method of charging a storage battery comprising the steps of determining the time required to restore to its normal operating capacity an unsulphated battery having the same state of discharge as the battery to be charged by impressing thereon a substantially constant voltage within a predetermined range, and, after the battery has been charged for a predetermined portion of the aforementioned time interval and without interrupting the charging operation, revising said time interval as required to compensate for the lower current flow due to the degree of sulphation of the battery being charged and to insure the restoration of the battery to its normal operating capacity at the constant voltage selected.

WILLIAM E. BRUNEY.

REFERENCES CITED

The following references are of record in the file of this patent:

UNITED STATES PATENTS

| Number | Name | Date |
| --- | --- | --- |
| 2,096,131 | Oestermeyer | Oct. 19, 1937 |
| 2,347,452 | Amsden | Apr. 25, 1944 |